(No Model.) 2 Sheets—Sheet 2.

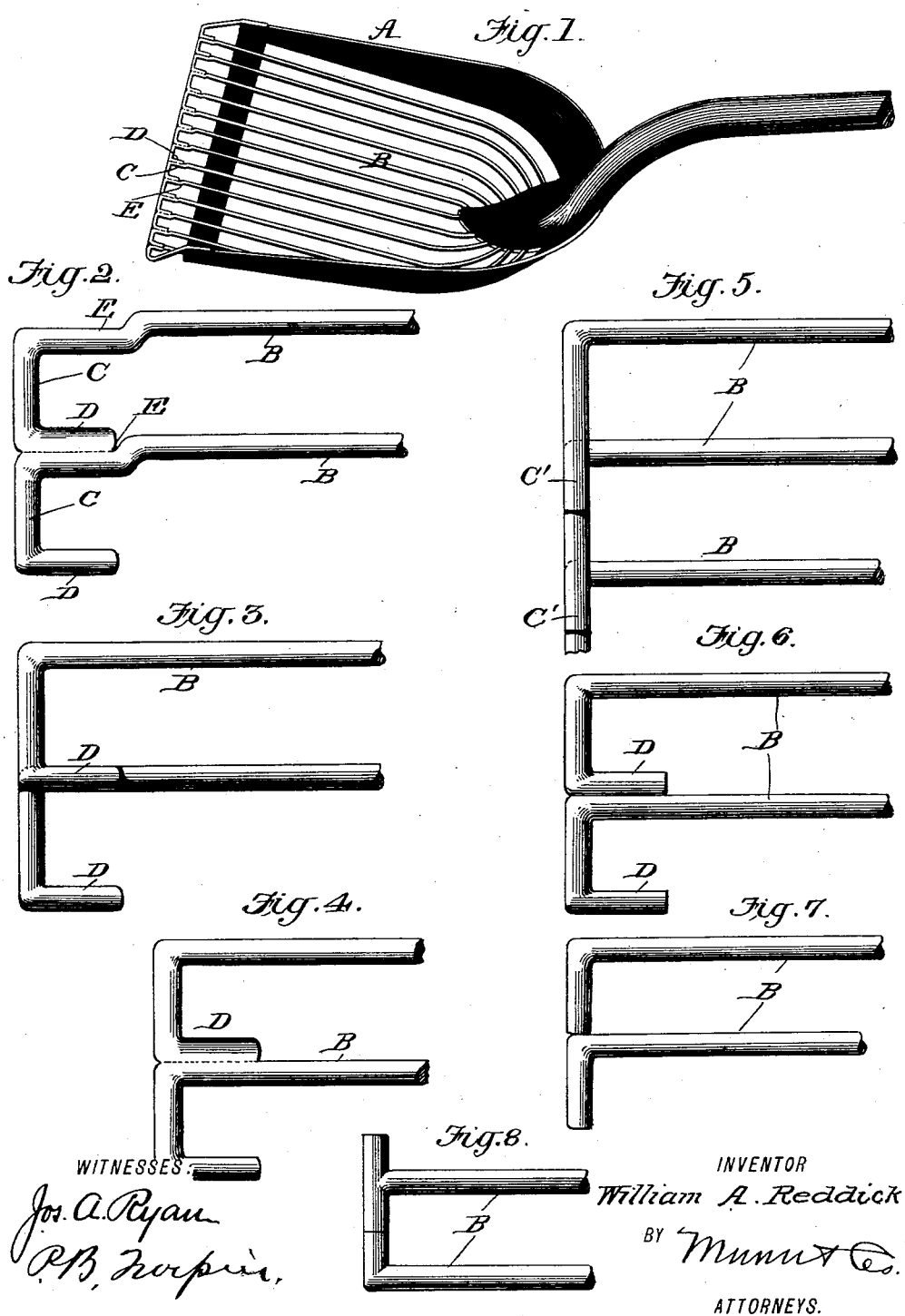

W. A. REDDICK.
POTATO SCOOP.

No. 591,691. Patented Oct. 12, 1897.

WITNESSES:
Jos. A. Ryan
P. B. Turpen

INVENTOR
William A. Reddick.
BY Munn & Co.
ATTORNEYS.

UNITED STATES PATENT OFFICE.

WILLIAM A. REDDICK, OF NILES, MICHIGAN.

POTATO-SCOOP.

SPECIFICATION forming part of Letters Patent No. 591,691, dated October 12, 1897.

Application filed October 16, 1896. Serial No. 609,086. (No model.)

*To all whom it may concern:*

Be it known that I, WILLIAM A. REDDICK, of Niles, in the county of Berrien and State of Michigan, have invented a new and useful Improvement in Potato-Scoops, of which the following is a specification.

My invention is an improvement in tined scoop-blades for use in handling potatoes and other vegetables and the like; and the invention consists in the novel construction of the tines, by which a continuous edge is provided thereby for the scoop-blade, all as will be hereinafter described, and pointed out in the claims.

Figure 9:
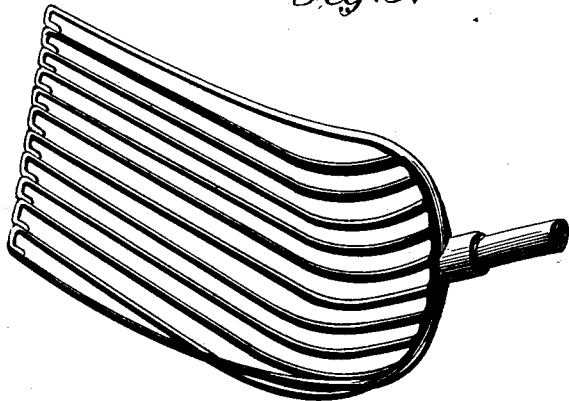
Figure 10:
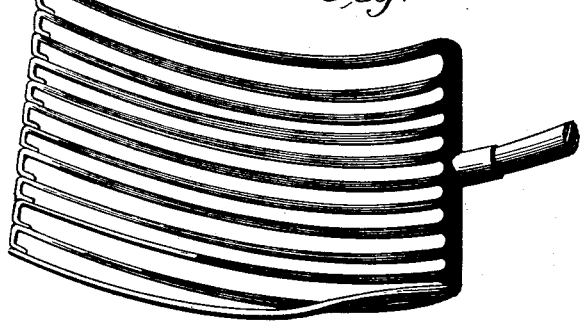

In the drawings, Figure 1 is a plan view of the scoop. Fig. 2 is a detail view of two tines, showing the connection. Figs. 3, 4, and 5 show other forms of joint between the tines, and Fig. 6 shows an instance in which the tines are not welded together. Fig. 7 shows another form in which the tines are not welded together. Fig. 8 shows a somewhat different form, and Figs. 9 and 10 show different forms of scoops or shovels.

The scoop has its blade A formed of tines B set up in scoop shape and having their front ends bent sidewise into loops adjacent to each other and forming a continuous edge for the scoop.

In carrying out my invention I bend the tines near their forward ends, forming a lateral extension or portion C, extending to the adjacent tine, the several lateral portions constituting the continuous front edge of the scoop. It is preferred to provide return portions D, lapping the adjacent tines. It is preferred to form the tines with offsets at E to receive the returned portions D, which are welded to the tines against which they are lapped. In Fig. 3 the returned portion is lapped upon and welded to the adjacent tine. In Fig. 4 the offset E is omitted and the returned portion is welded alongside the tine. In Fig. 5 I make the lateral portion to extend at C' past the adjacent tine and weld such portion in place. In Figs. 6 and 7 the lateral portion is not welded to the tine to which it extends. In Fig. 8 the tines are provided with lateral portions extending in both directions, the lateral portion of one tine meeting that of the next midway between the tines.

While it is preferred to secure the extremities of the lateral portions by welding, it is manifest they might be secured in other ways without departing from some of the broad principles of my invention.

Manifestly the form of the scoop may be varied, as will be understood from Figs. 9 and 10, and the invention may be embodied in various constructions of tined scoops. Thus instead of the scoop being formed with wire tines braced as shown in Fig. 1 it may be made of cast-steel or forgings, as will be understood from Figs. 9 and 10.

Having thus described my invention, what I claim as new, and desire to secure by Letters Patent, is—

1. A scoop-blade substantially as described formed with tines having at their front ends lateral portions extended on straight lines to the next adjacent tine, the several straight-line lateral extensions being in alinement and forming a straight-line edge at the front of the blade substantially as shown and described.

2. A scoop-blade composed of tines provided at their front ends with lateral portions extended to the next adjacent tine and positively connected with such tine at the point of contact therewith at the front edge of the blade substantially as shown and described.

3. A scoop-blade substantially as shown and described composed of tines provided at a short distance back from their front ends with lateral offsets, and having at their front ends lateral portions extended to the adjacent tines and having return bends fitting sidewise against the offset end portion of the said adjacent tine substantially as shown and described.

WILLIAM A. REDDICK.

Witnesses:
K. L. REDDICK,
R. W. REDDICK.